United States Patent [19]

Zingher et al.

[11] Patent Number: 5,091,859
[45] Date of Patent: Feb. 25, 1992

[54] CONTROL SYSTEM FOR A PRINTING PLANT

[75] Inventors: Oded Zingher, Alzenau; Arno Wuhrl, Muhlheim/Main; Stephan Suppes, Offenbach/Main, all of Fed. Rep. of Germany

[73] Assignee: MAN Roland Druckmaschinen AG, Fed. Rep. of Germany

[21] Appl. No.: 400,504

[22] Filed: Aug. 30, 1989

[30] Foreign Application Priority Data

Aug. 30, 1988 [DE] Fed. Rep. of Germany ....... 3829342

[51] Int. Cl.$^5$ ............................................. G06F 15/46
[52] U.S. Cl. ...................................... 364/471; 364/478
[58] Field of Search ................................ 364/471, 478

[56] References Cited

U.S. PATENT DOCUMENTS

| | | | |
|---|---|---|---|
| 4,472,783 | 9/1984 | Johnstone et al. | 364/468 X |
| 4,495,582 | 1/1985 | Dessert et al. | 364/518 X |
| 4,803,634 | 2/1989 | Ohno et al. | 364/471 X |
| 4,974,166 | 11/1990 | Maney et al. | 364/478 |

Primary Examiner—Jerry Smith
Assistant Examiner—Allen M. Lo
Attorney, Agent, or Firm—Leydig, Voit & Mayer

[57] ABSTRACT

A control system for a printing plant comprising a central computer and a plurality of substantially identical peripheral computers. The central computer has a memory including a table defining the functions of each peripheral computer. The table is transmitted for storage in definition memories of the peripheral computers. The table includes a list of allowed or non-allowed interface units for each of the peripheral computers. Each of the peripheral computers includes an array of connectors for interfacing with auxiliary equipment. Each peripheral computer is capable of polling the busy or non-busy status of each connector and utilizing that information in conjunction with information in the definition memory to determine the functions assigned to it. The system allows commonality of data in that the central computer defines the requirements for each of the peripheral computers, yet prevents overlap of function by assuring that an assigned peripheral unit can effect only the portion of the printing operation (via connected interface units) which is assigned to that particular device.

12 Claims, 2 Drawing Sheets

CONTROL SYSTEM FOR A PRINTING PLANT

FIELD OF THE INVENTION

This invention relates to printing plants and more particularly to a control system for coordinating the numerous on-press and off-press activities which are accomplished in a printing plant.

BACKGROUND OF THE INVENTION

There are numerous functions which are performed in a printing plant which are related to each other in that, for example, they deal with the same printing job, but unrelated in that they deal with quite distinct aspects of that job, for example, make-up, printing and distribution. The printing industry has evolved to include automation and computerized control for many of the independent areas, such as computerized press controls, computerized make-up equipment, and the like. However, the problem exists of coordinating information from different departments (both on-press and off-press), or in coordinating different (historically independent) aspects of the same printing job (or many printing jobs) for overall plant operation. That difficulty is amplified by the different automation or computerization controls that have grown up for the various departments, and the very limited (if any) attempt to coordinate those units even insofar as commonality of data is concerned much less commonality of communication.

For example, a number of different areas in a typical printing plant can be considered to be administration, work preparation, logging of operating data, and quality control (which can include the actual printing operation). Those activities are typically considered to be entirely separate entities, although many of them require the same or similar data. For example, administration might be involved with the ordering and logistics in connection with basic supplies and raw materials, provision of an adequate work staff, etc. Labor time and costs stored in the administrative database can be used in estimating a particular printing job. Work preparation often involves makeup, including the making of plates, the setting up of the press, special requirements for particular jobs, and other ancillary data or operations. Logging of operating data typically means just that and includes maintaining adequate records of length of run, raw materials consumed, product produced, down time, time during which the press is producing unacceptable or acceptable product, etc. Finally, quality control typically includes not only the operation of the press but maintenance of printed standards at the press output. Those separate functions are often referred to herein as separate "departments" for convenience of reference, the idea being conveyed is that they comprise separate functional groups of operations within a printing plant.

In many cases, the identical data is required for more than one of the foregoing operations, but since the systems which operate those areas are independent, incompatible and not interconnected, to the extent the same data is needed in more than one operation, it must be relogged for each of those operations, at a considerable wasted expense. In short, a substantial amount of time is often spent on activities which have already been completed elsewhere.

As an example of the interrelationship of the separate operating areas of a typical printing plant, data associated with ordering of raw materials is not only important to the administrative aspect of the press operation, but can also be used in actual production. Furthermore, production data can be used for operating data logging and administrative operations. Also, data which is typically logged to cover the operating parameters of a particular job can also be used in the work preparation in order to calculate the number of consumables needed for a similar job. Other similar examples will occur to those adequately skilled in this art.

In spite of the known interrelationship of the data for the various functional entities which make up a printing plant, there has been no completely satisfactory answer to the problem of utilizing a data set only once and transmitting that data set to as many of the independent departments as require it. If it were possible to utilize a data set which is once generated in as many related areas as require it, the possibility of errors in rekeying the data as well as wasted expense in reformatting and rekeying the data would be avoided. However, insofar as overall printing plant operation is concerned, either decisions are made on the basis of an inadequate set of data, or alternatively substantial duplication of effort is required in order to translate from one operating environment of the plant to a related but independent operation.

SUMMARY OF THE INVENTION

In view of the foregoing, it is a general aim of the present invention to provide a printing press control system which unifies heretofore independent departments of the printing plant for exchange of information between those elements and a central computer, while still providing autonomy of control within the independent departments.

In that respect, it is an object of the present invention to provide a computerized control system utilizing a plurality of substantially identical peripheral computers and a single central computer, the central computer having the capability of defining the functions of each of the peripheral computers.

It is a more detailed object of the invention to provide in such a system the ability for the central computer to define the functions of each peripheral computer to control only those portions of the printing plant with which it is associated, while allowing the exchange of information with the central computer so that the central computer can process and redistribute data to independent portions of the printing plant.

According to another aspect of the invention, an object is to utilize peripheral computers of substantially identical configuration, each of the computers having the ability to interface with any of the auxiliary equipment in the printing plant, but providing means in each peripheral computer for defining its particular function in part by the nature of the auxiliary equipment to which it is connected.

An object, according to this aspect of the invention, is to provide a control system for a printing plant in which the use of uniform computers leads to consistency of control in all departments, and enables the data generated in any such department to be processed for use in other departments.

According to yet a further aspect of the present invention, an object is to provide each peripheral computer with means for storing sequences of events in the memory thereof, editing the sequence as necessary, and executing the sequence on demand under the control of the peripheral computer.

It is a feature of the present invention that a control system is provided for a printing plant which allows use of substantially identical computers for each of the separate and individualized control functions, allows the sharing in the central computer of data which originates at those individual computerized control stations, but prevents the cross-control of one area of the printing plant by a computer dedicated to a completely separate area. Thus, the central system is capable of acquiring data from each of the units to be parcelled out to any of them as needed, but prevents the loss of control which might occur from the simple distribution of non-dedicated substantially identical computers in the respective areas of the printing plant.

It is a subsidiary feature of the invention that the computerized controls in one or more of the printing plant areas can be provided with means for storing, editing and executing, upon command, sequences of control operations without the intervention, during execution, of the press operator.

In accordance with the invention, there is provided a control system for a printing plant including a central computer having a central computer memory and a plurality of substantially identical peripheral computers. At least one of the peripheral computers is interfaced with the printing press and at least another with auxiliary equipment for off-press functions. Each of the peripheral computers has connectors for interfacing with various auxiliary equipment, and the particular auxiliary equipment which is connected to the peripheral computing unit is sensed by means internal to the peripheral unit. Each peripheral unit has a definition memory which is written by the central computer, and which defines the identity of the particular peripheral unit. That definition memory is used along with an indicator of which auxiliary equipment is connected to the peripheral unit in defining the functions which can be performed by the peripheral unit. Data collected by the peripheral unit is read by the central computer for providing an integrated database which can be shared by the other peripheral units for performing their individual functions.

Other objects and advantages will become apparent from the following detailed description, when taken in conjunction with the drawings, in which:

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
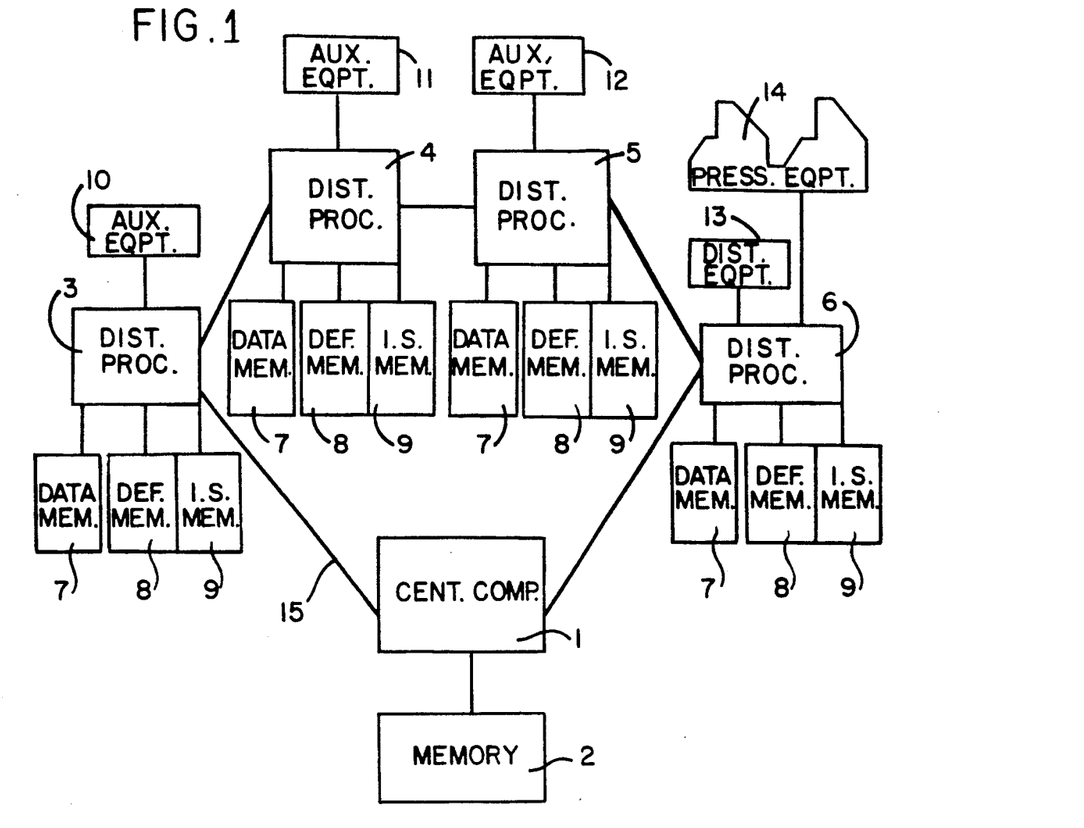
FIG. 1 is a block diagram illustrating a control system for a printing plant exemplifying the present invention.

Turning now to the drawings, FIG. 1 shows an exemplary control system for a printing plant. The system is based on a central computer 1 which has a central computer memory 2 associated therewith. The memory 2 can include not only the typical random access or read/write memory utilized as a working memory, but also will typically include a mass storage device such as a disk or tape drive. The memory 2 contains all of the data necessary to operate the system, and in addition includes a section of memory, herein termed a "table", which defines the attributes of each of a plurality of peripheral computer units. As will become more apparent in connection with the following description, the table of definition information allows for distributed processors to control related aspects of the printing plant independently of each other, but to collect data which can be associated with other peripheral computers by way of the central computer 1. Thus, the central computer 1 and its associated memory 2 includes means for storing operating data interchanged with each of the peripheral computer units so as to avoid the necessity described above of duplicative inputting of common information utilized by more than a single area in the printing operation. It is also noted that the definition information above is said to be stored in a "table". That word is used to provide a simple identifier for the relational data, and does not necessarily imply a tabular arrangement of the attributes, but merely a section of memory (be it tabular or not) which defines the attributes of each of the plurality of peripheral computing units.

In practicing the invention, a data link 15 emanates from the central computer 1 and is used to provide a communication link with a plurality of distributed processors 3-6. The processors are preferably substantially identical units, not only to simplify the equipping of the printing plant, but also as an aid in operator training to provide commonality of control equipment between the respective areas of the printing plant. FIG. 1 shows that each of the peripheral computing units 3-6 has its own memory comprising memory elements 7-9, and each is interfaced to an associated grouping of press equipment 10-14.

Turning first to the memory structure, it is seen that each of the peripheral computers 3-6 has its own data memory 7, which is used in conventional fashion for storage of program, storage of temporary results, and storage of data to be used by the associated processing unit 3-6.

In addition, and in practicing the invention, each of the peripheral computers 3-6 has a definition memory 8 which contains data provided on the communication link 15 by the central computer 1 to define the functions of each of the peripheral computers 3-6, and in the process assign a particular identity to each peripheral computer unit. Also as an element of the memory for each of the peripheral computers 3-6 is an instruction sequence memory 9 which is programmed to store and edit particular sequences of instruction and to execute those sequences upon command by an operator. The memory 9 is shown associated with the definition memory 8 to emphasize that only operations are performed which are defined for the particular peripheral unit in question.

FIG. 1 shows that, in addition to the memory structure associated with each of the peripheral computers 3-6, there is a particular portion of the printing plant associated therewith, illustrated schematically as off-press auxiliary equipment 10-13 or the on-press actual printing press equipment 14. Assuming the breakdown given above in connection with printing plant operations, the peripheral computer 3 exemplifies an administration computer. In that case, the auxiliary equipment 10 to which the administrative peripheral computer 3 is connected is typically a main frame computer which stores and manipulates data concerning the printing industry. Such data can be manipulated or extracted by peripheral computer 3 in performing its administrative functions, such as estimating an incoming job, determining profitability of an outgoing job, and the like.

Peripheral computer 4, in the exemplary embodiment, is assigned to the work preparation area, and is interfaced to auxiliary equipment 11 in the form of a data input device 11 such as a disk scanner which contains data with respect to different types of jobs, to enable, for example, establishing data for preparing a print order for a given job. The data on scanner 11 will include, for example, quantities of and specifications for consumables needed to print a particular order, scheduling timetables for plate preparation, etc., and the like. The peripheral units included within box 11 may also, in particular circumstances, include operations related to the actual making of plates which will be needed on the press to prepare a particular print order.

The third peripheral computer in the communication link is peripheral computer 5 assigned, in the exemplary embodiment, to a data logging function. As such, the data logging computer 5 is interfaced to auxiliary equipment 12, some of which is on-press, and some of which is located off-press in, for example, the press control room. Information logged in a database associated with peripheral unit 5 will include the consumption of consumables for a particular job, press running time, press down time, press failures, reasons for press failures, performance of particular press crews, and the like. It will be appreciated that the data collected and logged in auxiliary equipment 12, and interfaced to the overall system via data logging computer 5, will serve as an effective management tool, for example, when associated with administration data from peripheral computer 3 in estimating of new jobs.

The peripheral computer 6 in the illustrated embodiment is associated with the quality control function and is thus interfaced to two units including the actual printing press 14 as well as on-press auxiliary equipment 13 which can, for example, be a quality control scanner which scans the printed product. Thus, the peripheral computer 6 exercises an on-line control function during the printing of a job by means of the connections to the printing press 14, and also serves as a quality control check by means of the scanner in the auxiliary equipment 13 to determine if the job is being printed within specification and, if not, to make an appropriate adjustment on the printing press 14. It will be readily appreciated that logging of data during the course of operating the quality control peripheral computer 6 results in information which can also be useful to logging computer 5 insofar, for example, as running time for producing acceptable versus unacceptable quality is concerned.

Each of the peripheral computers 3-6 is preferably a standard personal computer or desktop computer, and all are preferably substantially identical. As is suggested in FIG. 2, each of the computers includes an array of connectors 18 for interfacing with the printing plant auxiliary equipment. Thus, a particular unit can be given an identity in part by locating it in the portion of the printing plant with which it is intended to operate, then connecting the auxiliary equipment associated with that portion of the plant to connectors within the connector array 18 particularly designed for auxiliary peripheral equipment. The peripheral computer can be moved, if desired, to another location and assigned an entirely new identity, and connectors within the array 18 are already provided for connection to the auxiliary equipment associated with that portion of the printing plant. In the showing of FIG. 1, the array of connectors 18 (FIG. 2) is intended to connect the particular peripheral computer 3, 4, 5 or 6 to its associated on-line equipment 14, off-line equipment 10-12, or equipment which has both on-line and off-line aspects such as quality control equipment 13. As will be described in greater detail below, each peripheral computer has means for sensing the busy or non-busy status of each of the connectors in array 18 (to determine if an auxiliary piece of equipment is or is not connected to each particular connector) and utilizes that information not only in assessing its own identity but also in determining which peripheral functions within the printing plant it can control.

The communication link 15 of FIG. 1 is illustrated as a simple multiple conductor bus. Those skilled in the art of computer communications will appreciate that the communication link 15 can be a conventional star or ring network. The communication link can be implemented by any known means, the point more significant than network topology being the arrangement of peripheral equipment and the information communicated to that equipment along the communication link which is designed to provide each of the peripheral computers with its individual identity in the printing plant environment.

Before turning to the manner of providing an identity for each of the peripheral computers, communication from the peripheral units with the central computer 1 will first be described. The types of data which are manipulated by the respective computers 3-6 has been discussed above, at least insofar as examples are concerned. It was also pointed out that the data associated with a particular peripheral computer can be of interest to either the central system, or as modified by the central system, to another peripheral computer in performing its associated function. To that end, the data which is manipulated within each of the peripheral computers 3-6 is communicated back to the central computer 1 by means of the communication channel 15. Thus, everything from administrative data manipulated by the administrative computer 3 to make ready data manipulated by work preparation computer 4, to performance data manipulated by logging computer 5 to the actual running data manipulated by quality control computer 6 is communicated to the central computer 1 and thence stored in the central computer memory 2. That information can be manipulated for providing process data representative of data derived from more than one of the sources 3-6, and the process data can be utilized not only within the central computer 1, but can also be communicated to the peripheral computers 3-6 for use in performing their individual functions. Thus, printing industry data originating from administrative computer 3 can be combined with actual running data from logging computer 5, the combination taking place in the central computer 1, and the result of that information used in work preparation computer 4 for generating make-ready information to schedule a job for actual production. Historical running information stored in logging computer 5 can be compared with actual performance data produced during a run in quality control computer 6, and the result utilized by work preparation computer 4 to assure that adequate consumables are on hand to complete the job under the performance characteristics then being encountered. The various types of data and modes of combining data which can be achieved by the networked system for the overall printing press operation as described in connection with FIG. 1 will now be apparent.

In order to assign each of the peripheral computers 3–6 to its independent function and prevent overlap of control (to prevent an administrative worker from operating the press as an example), the central computer 1 acting by way of its central computer memory 2 stores tables of information defining the identity or function of each of the peripheral computers 3–6. That information is communicated on communication channel 15 to each of the peripheral computers, such as during system start-up, when any of the peripheral computers is started up, or the like. The definition information originally stored in central computer memory 2 and communicated via channel 15 to each of the peripheral computers is stored in the definition memory 8 associated with each of those computers. The central system, in addition to defining the functions for each of the peripheral computers by way of tables set up in definition memory 8, assigns a specific identity to each of the peripheral computers.

The identity and functions associated with a particular peripheral computer can be assigned in a number of ways. As one example, the central memory 2 stores a table of functions to be performed by each of the peripheral computers, and that table of functions is transmitted to each of the peripheral computers for storage in the definition memory 8. Along with that table of information is an identifier as to the role assigned to each particular peripheral computer such that it can refer to the table and determine the functions which are allowed to it.

As a further example, the central memory 2 stores a list of all assets associated with or function to be performed by the peripheral computers, transmits that list to all of the peripheral computers 3–6, and transmits a set of flags to each of the respective peripheral computers identifying to the peripheral computers the functions which are allowed to it (by way of the flags) or those functions which are not-allowed to it (by way of the absence of flags). Suffice it to say that numerous means are available for communicating the functions to be performed by the peripheral computers and the identity of each peripheral computer from the central computer 1 to the definition memories 8 so that each particular peripheral computer has defined within itself both the functions it is capable of performing and its identity within the overall system.

Thus, each of the peripheral computers 3–6 knows by examining definition memory 8 not only its own identity, but also the functions which are allowed to that peripheral computer. As a result, functions which are non-allowed to a particular peripheral computer can be prevented, thus avoiding the undesirable cross-control between printing plant functions noted above. The functions which are allowed to a particular peripheral computer can include off-press functions such as servicing of auxiliary equipment 10–12, on-press functions such as servicing the printing press 14, or hybrid functions which have both on-press and off-press aspects such as servicing the quality control equipment 13.

Figure 2:
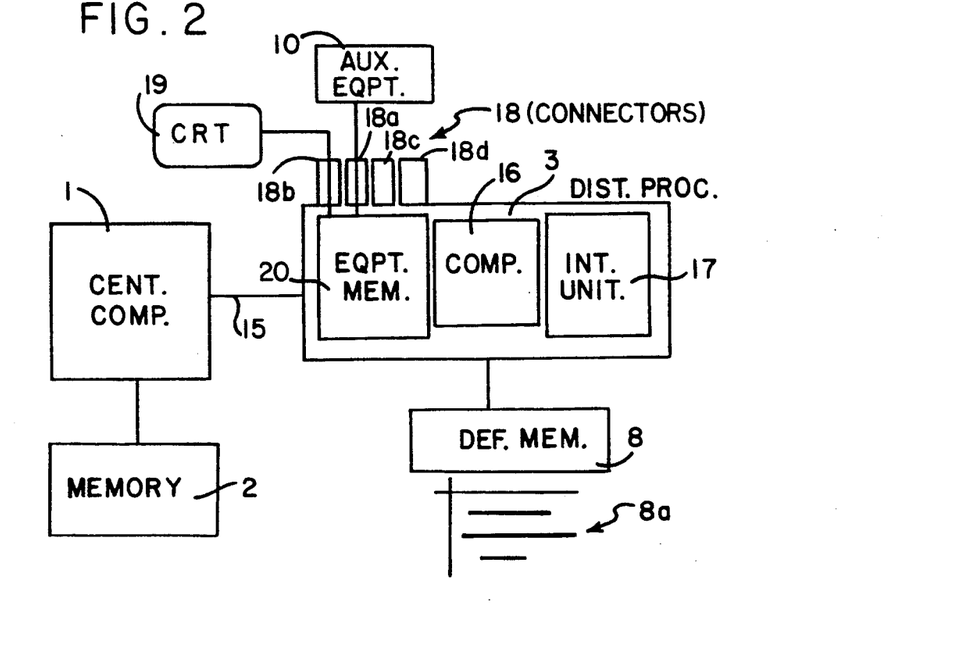
FIG. 2 is a block diagram illustrating additional details of one of the peripheral computing units of the system of FIG. 1.

In practicing the invention, each peripheral computer 3–6 examines not only the information in its definition memory 8, but also the busy or non-busy status of its connector array 18 in determining which of a plurality of functions should be performed under any given set of circumstances. FIG. 2 illustrates that aspect of the invention as it applies to one of the peripheral computers 3, in FIG. 2 the administrative computer 3 being taken as exemplary of the others. It is seen that the peripheral computer 3 is connected to the definition memory 8 which stores a table 8a defining the functions of the peripheral computers. In the preferred embodiment, the table 8a defines the functions of all of the peripheral computers and in addition defines the identity of the particular peripheral computer 3. Thus, the processor 3 by examining the definition memory 8 can determine whether a particular function requested of it is within the array of functions which it is intended to perform.

Part of that definition is by way of the connector array 18 as described above. It is seen in FIG. 2 that the administrative auxiliary equipment 10 is connected to peripheral computer 3 by means of connector 18a. A second connector 18b is provided for connecting a display device such as CRT 19. Unused connectors 18c, 18d are representative of additional connectors within the array 18 which are provided either for use with additional auxiliary equipment in the administrative department or for connection to auxiliary equipment in other departments of the printing plant when the computer is installed elsewhere.

FIG. 2 also shows the central computer 1 and its associated memory 2 connected by communication link 15 to the administrative peripheral computer 3. It is by that channel, as described above, that the definition information 8a is written into definition memory 8. Thus, the information received from central computer 1 and stored within the peripheral computing equipment at location 3 includes the definition of that equipment as the administrative peripheral computer.

The peripheral computer 3 in the FIG. 2 diagram is illustrated as including a logical comparator 16 which makes decisions on the functions to be performed by the peripheral computer in response to determinations made by an interrogator unit 17 and activated auxiliary equipment memory 20. The activated auxiliary equipment memory 20 monitors the busy or non-busy status of the connectors within array 18 to determine the identity of any auxiliary equipment connected to the peripheral computer. When the memory unit 20 detects that a particular unit of auxiliary equipment is connected to its associated interfacing connector, that fact is displayed on the display 19, indicating to the operator that the peripheral equipment in question is connected and operational. The indication on the display 19 can be by a line of text on an appropriate status screen indicating the nature of the connected equipment, by a tinted element within an array indicating active equipment, or simply by lighting an associated LED. In any event, the display 19 indicates to an operator the fact that a particular unit of auxiliary equipment is present, or in the absence of an indicator, that it is absent.

In addition to determining and displaying the fact that a particular unit of associated auxiliary equipment is connected and operational, the peripheral computer 3 also performs the function of determining whether an improper piece of auxiliary equipment is connected. For example, and referring to the administrative computer 3 of FIG. 2, assuming that the quality control scanner 13 were connected to the appropriate jack and the administrative computer is not designated to operate in conjunction with the quality control scanner, the system of FIG. 2 would determine that fact and prevent operation of the quality control scanner. More particularly, the auxiliary equipment memory 20 determines the presence of a particular unit of peripheral equipment, in the example, the quality control scanner 13. However, the comparator 16 in determining whether a particular unit of auxiliary equipment should be serviced by the peripheral computer 3 will, prior to servicing that equipment, compare the presence of that equipment (determined by interrogating memory 20) with the allowed or non-allowed status of that equipment (determined by interrogating definition memory 8). Since the definition memory 8 will indicate that the administrative computer 3 has no relationship to the quality control scanner 13, the comparator 16 will determine that the quality control scanner, even though its connection is sensed by activation memory 20, is not to be serviced by the peripheral computer 3, and will prevent such servicing. Thus, the possibility of undesired cross-control of elements in the printing plant in a highly centralized system is avoided.

More particularly, substantially all of the elements of the printing plant can have data manipulated by associated peripheral computers 3-6, and all of that data can be channeled to a central computer 1 for processing. All of the computers 3-6 can be substantially identical such that it is possible to move a particular piece of hardware equipment from one place to another and substantially change its identity. However, by means of the definition memories and the content thereof which is communicated from the central computer 1, the system substantially prevents unauthorized performance of functions from control equipment not intended to affect those functions. Thus, if someone operating on make-ready of a job to be printed is operating in connection with work preparation computer 4, and even though work preparation computer 4 has access to process data which originated from quality control computer 6, by virtue of the different identities stored in definition memories 8 of the computers 4 and 6, it is impossible for an operator using computer 4 to affect press operation which is assigned to computer 6, even though the equipment is substantially identical. It is this commonality of data coordinated with segregating of function which is important to enhancing efficiency while maintaining adequate control in operating a printing plant according to the present invention.

Figure 3:
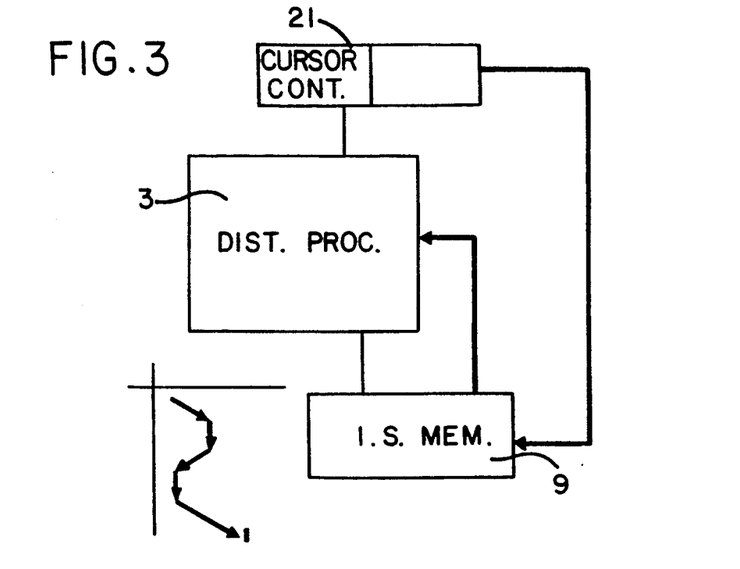
FIG. 3 is a block diagram illustrating an auxiliary system for the peripheral units for automatic execution of editable sequences of instructions.

In addition to the centralized reporting and distributed control aspects of the invention, the peripheral computers can store (and edit if necessary) sequences of operations, and to report either those sequences or the result of those sequences to the central computer 1 as necessary. To that end, each of the peripheral computers 3-6 is provided with an instruction sequence memory 9 which is adapted to function with the other memory elements 7, 8 in controlling and reporting on the connected auxiliary equipment and the operation thereof. The interrelationship between those elements is best illustrated in FIG. 3 which shows a form of control for editing and executing stored sequences of instructions. FIG. 3 shows, as an example of the other peripheral computers, the administrative computer 3 and its associated instruction sequence memory 9. The memory 9 stores information representing particular sets of instruction sequences, such as those most recently selected by the pressman, or those most typically used by the pressman. The sequences in one or more preprogrammed routines can be displayed, if necessary, on the CRT 19 shown in FIG. 2. The processor includes a cursor control 21 which is adapted to scroll forward or backward between sets of instructions comprising different sequences, or individual instructions within a given sequence. Thus, by operating the cursor control 21, signals are conveyed to the administrative peripheral computer 3, and simultaneously to the instruction sequence memory 9. The combined operation can scroll through instructions within the memory 9 to select a particular sequence. Following the identification of a particular sequence by means of operating cursor control 21, an execute instruction causes the peripheral computer 3 to execute the stored sequence. The stored sequence is illustrated by the chart at the lower left of FIG. 3 which schematically illustrates a sequence of steps having a beginning point and an ending point which is automatically controlled by individual instructions stored within instruction sequence memory 9, but automatically executed in the stored sequence.

Figure 4:
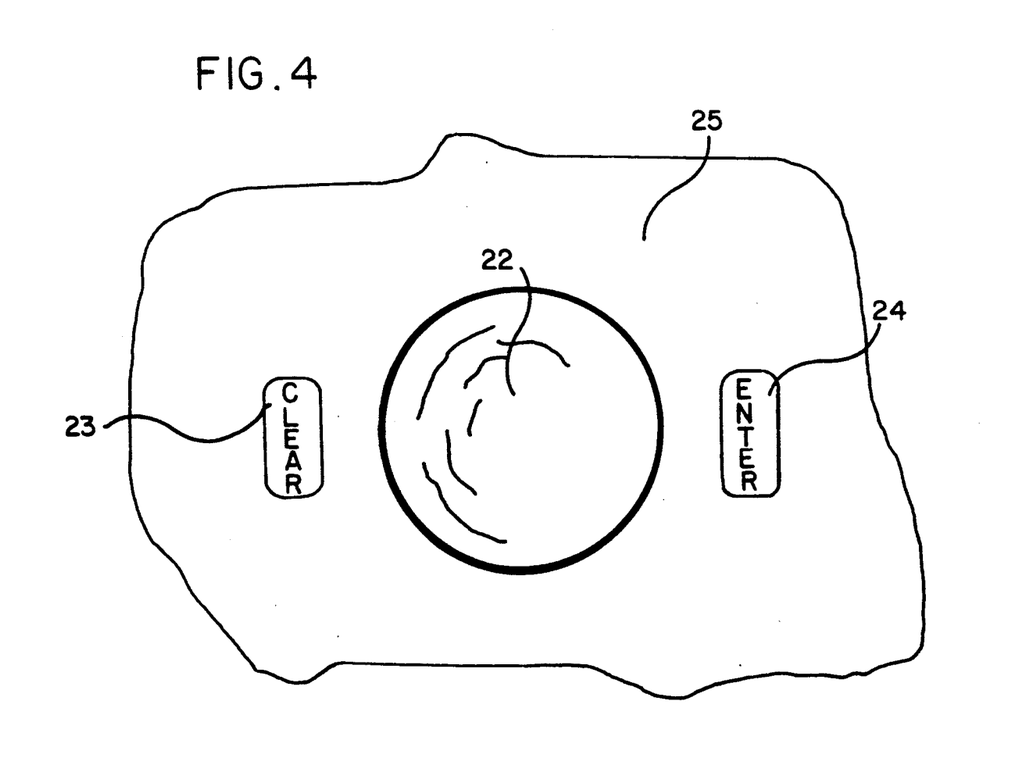
FIG. 4 is a diagram illustrating a portion of a control panel for use with the subsystem of FIG. 3.

The control panel for operating the system of FIG. 3 is better illustrated in FIG. 4 and may include a track ball 22 operating in conjunction with a clear key 23 and an enter key 24. Thus, a cursor on the display 19 can be sequenced by movement of the track ball 22, and individual instructions either deleted by operation of clear key 23 or entered by operation of enter key 24 until a desired sequence of instructions is assembled. Then by a particular action, such as dual depression of the enter key 24, the stored sequence is executed. The instruction sequence memory 9 (see FIG. 1) is closely associated with definition memory 8, to illustrate that the instructions which are entered in the sequence and ultimately performed by the system are indeed within the definition for that particular peripheral computer. In addition, it will be seen that the peripheral computer 3 has the ability to route the results of performance of the instructions set to temporary data storage within the memory 7 such that the result of the operation can be communicated on data link 15 to the central computer 1 as needed.

Thus, utilization of the invention in connection with the instruction sequence memory 9 also achieves the important aspects of the invention in defining for a particular substantially common unit of peripheral computing equipment a particular subset of off-press or on-press functions assigned to that unit, reporting data from that subset of functions to a central computer for processing, receiving data from that central computer for performance of the assigned peripheral functions, and at the same time locking out the ability of the peripheral unit to affect any but the assigned functions when performing its control operation. Thus, each peripheral unit by means of the communication link 15 can be configured with its particular identity each time the system restarts, and if it is desired to permanently reconfigure the system, to simply change the system configuration in central memory 2 for communication to the particular peripheral computers. The range of work which can be accomplished in any given department is expanded considerably since additional data is more widely available to it. Furthermore, such data availability is achieved without an increase in security risk, since cross control from department-to-department is substantially inhibited. The opportunity to use substantially identical computers in each of the peripheral departments is a further advantage of the invention.

What is claimed is:

1. A control system for a printing plant, the printing plant performing on-press operations involving a printing press and off-press operations involving auxiliary equipment, the control system comprising, in combination:

a central computer having a central computer memory;

a plurality of substantially identical peripheral computers, at least one of which is interfaced with the printing press for on-press functions and at least one of which is interfaced with auxiliary equipment for off-press functions;

the central computer memory having locations for storing definition information for defining the functions of each of the peripheral computers;

each of the peripheral computers including a plurality of connectors for interfacing with the press and the auxiliary equipment, each of the peripheral computers also having its own memory including a definition memory;

a data link linking the central computer top each of the peripheral computers and allowing transfer of information between the central computer memory and the memories of the peripheral computers, said information including definition information transferred from the central computer to the definition memory of each of the peripheral computers for defining the respective functions thereof;

means in each peripheral computer for reading the definition memory to define the functions to be performed by that peripheral computer and the allowable auxiliary devices with which it can be interfaced;

interface control means in each peripheral computer for sensing the busy or non-busy status of each of said connectors, means for comparing the busy or non-busy status of each connector with the functions attributed to that particular peripheral unit by the definition memory for determining the allowed or non-allowed status of the connected unit of auxiliary equipment, and means for exchanging signals with only the allowed auxiliary equipment for each particular peripheral computer as defined by the definition memory; and the definition memory further including a table of functions for each of the peripheral computers, and means identifying the particular functions to be performed by the respective peripheral computers.

2. The control system as set forth in claim 1 wherein the peripheral computers include an administrative computer for performing administrative functions, a work preparation computer for processing pre-press data, a logging computer for processing post-press printed results, and a quality control computer for interface with the printing press for making running adjustments to the printing press.

3. The control system as set forth in claim 1 wherein the memory associated with each of the peripheral computers includes an instruction sequence memory for storing a sequence of instructions for performance by the associated peripheral computer, and means for initiating the performance of the stored sequence of instructions.

4. The control system as set forth in claim 3 in which each peripheral computer further includes means for editing the sequence of instructions in the instruction sequence memory.

5. The control system as set forth in claim 4 wherein the instruction sequence memories each include cursor control means for editing the stored sequence of instructions, and an execute key for initiating execution of the edited sequence.

6. The control system as set forth in claim 1 wherein each peripheral computer further includes a display responsive to the interface control means for displaying the identity of each allowed unit of peripheral equipment sensed by way of the busy status of the associated connector.

7. A control system for a printing plant, the printing plant performing on-press operations involving a printing press and off-press operations involving auxiliary equipment, the control system comprising, in combination:

a central computer having a central computer memory;

a plurality of substantially identical peripheral computers, at least one of which is interfaced with the printing press for on-press functions and at least one of which is interfaced with auxiliary equipment for off-press functions;

the central computer memory having locations for storing definition information for defining the functions of each of the peripheral computers;

each of the peripheral computers including a plurality of connectors for interfacing with the press and the auxiliary equipment, each of the peripheral computers also having its own memory including a definition memory;

a data link linking the central computer to each of the peripheral computers and allowing transfer of information between the central computer memory and the memories of the peripheral computers, said information including definition information transferred from the central computer to the definition memory of each of the peripheral computers for defining the respective functions thereof;

means in each peripheral computer for reading the definition memory to define the functions to be performed by that peripheral computer and the allowable auxiliary devices with which it can be interfaced;

interface control means in each peripheral computer for sensing the busy or non-busy status of each of said connectors, means for comparing the busy or non-busy status of each connector with the functions attributed to that particular peripheral unit by the definition memory for determining the allowed or non-allowed status of the connected unit of auxiliary equipment, and means for exchanging signals with only the allowed auxiliary equipment for each particular peripheral computer as defined by the definition memory; and the definition memory further comprising a table of functions to be performed by the peripheral computers, and means assigning particular functions to the respective peripheral computers for performance thereby.

8. The control system as set forth in claim 7 wherein the peripheral computers include an administrative computer for performing administrative functions, a work preparation computer for processing pre-press data, a logging computer for processing post-press printed results, and a quality control computer for interface with the printing press for making running adjustments to the printing press.

9. The control system as set forth in claim 7 wherein the memory associated with each of the peripheral computers includes an instruction sequence memory for storing a sequence of instructions for performance by the associated peripheral computer, and means for initiating the performance of the stored sequence of instructions.

10. The control system as set forth in claim 9 in which each peripheral computer further includes means for editing the sequence of instructions in the instruction sequence memory.

11. The control system as set forth in claim 10 wherein the instruction sequence memories each include cursor control means for editing the stored sequence of instructions, and an execute key for initiating execution of the edited sequence.

12. The control system as set forth in claim 7 wherein each peripheral computer further includes a display responsive to the interface control means for displaying the identity of each allowed unit of peripheral equipment sensed by way of the busy status of the associated connector.

* * * * *

(12) REEXAMINATION CERTIFICATE (4509th)
United States Patent
Zingher et al.

(10) Number: US 5,091,859 C1
(45) Certificate Issued: Jan. 1, 2002

(54) CONTROL SYSTEM FOR A PRINTING PLANT

(75) Inventors: Oded Zingher, Alzenau; Arno Wuhrl, Muhlheim/Main; Stephan Suppes, Offenbach/Main, all of (DE)

(73) Assignee: MAN Roland Druckmaschinen AG (DE)

Reexamination Request:
No. 90/005,559, Nov. 12, 1999

Reexamination Certificate for:
Patent No.: 5,091,859
Issued: Feb. 25, 1992
Appl. No.: 07/400,504
Filed: Aug. 30, 1989

(30) Foreign Application Priority Data

Aug. 30, 1988 (DE) .............................. 3829342

(51) Int. Cl.$^7$ .............................. G06F 19/00
(52) U.S. Cl. ........................ 700/117; 700/127
(58) Field of Search ................. 700/117, 127, 700/213

(56) References Cited

U.S. PATENT DOCUMENTS

| | | | |
|---|---|---|---|
| 4,508,034 A | 4/1985 | Bolza-Schunemann | 101/365 |
| 4,553,478 A | 11/1985 | Greiner et al. | 101/426 |
| 4,754,428 A | 6/1988 | Schultz et al. | 364/900 |
| 4,955,290 A | 9/1990 | Kipphan et al. | 101/183 |
| 5,287,194 A | 2/1994 | Lobindo | 358/296 |
| 5,467,436 A | 11/1995 | Rodi et al. | 395/114 |
| 5,580,177 A | 12/1996 | Gase et al. | 400/61 |
| 5,602,970 A | 2/1997 | Janser | 395/109 |

FOREIGN PATENT DOCUMENTS

| | | |
|---|---|---|
| CA | 1 222 805 | 6/1987 |
| CA | 1 223 972 | 7/1987 |
| CA | 1 224 668 | 7/1987 |
| DE | 24 26 057 | 12/1974 |
| DE | 28 39 345 | 3/1979 |
| DE | 27 54 941 | 6/1979 |
| DE | 32 09 046 A1 | 3/1982 |
| DE | 43 29 886 A1 | 3/1995 |
| EP | 0 096 238 | 5/1983 |
| EP | 0 216 336 | 4/1987 |
| EP | 0 356 704 B1 | 7/1989 |
| EP | 0 395 890 B1 | 1/1996 |
| GB | 2 022 870 A | 12/1978 |
| JP | 60-229114 | 11/1985 |
| JP | 01-145718 | 6/1989 |

OTHER PUBLICATIONS

MS WORD Profibuch, Pre '88.
"Formula from Heidelberg: CPC 1+CPC 2–S+CPC 3+CPC 4=CPData", *Der Druckspiegel* (128, 130), Feb. 1993.
"From Machine Controls to Data Centers", *Der Polygraph* (23–24), Jun. 1993.

(List continued on next page.)

*Primary Examiner*—Paul P. Gordon (57) ABSTRACT

A control system for a printing plant comprising a central computer and a plurality of substantially identical peripheral computers. The central computer has a memory including a table defining the functions of each peripheral computer. The table is transmitted for storage in definition memories of the peripheral computers. The table includes a list of allowed or non-allowed interface units for each of the peripheral computers. Each of the peripheral computers includes an array of connectors for interfacing with auxiliary equipment. Each peripheral computer is capable of polling the busy or non-busy status of each connector and utilizing that information in conjunction with information in the definition memory to determine the functions assigned to it. The system allows commonality of data in that the central computer defines the requirements for each of the peripheral computers, yet prevents overlap of function by assuring that an assigned peripheral unit can effect only the portion of the printing operation (via connected interface units) which is assigned to that particular device.

OTHER PUBLICATIONS

"The online offset printshop: new ways of integrating all production stages in process management systems", *Druckerei–Management*, Apr. 13, 1995.

"Service Information in a Notebook", *Polygraph Treffpunkt Druckindustrie* (36, 50,–51), Feb. 1996.

"Local Area Networks", *VDI–Z*, Feb. 1986.

"Auch Reproabteilungen von Grossdruckereien stehen mit Reprofirmen im Wettbewerb"?.

Gunter Biethan, "MS–DOS/PC–DOS kurz und bundig", *Chip Special*, Aug. 1987.

MAN Roland Druckmaschinen AG, Offenbach/Augsburg, Hall 5, Stand 5 A 40, *Deutscher Drucker*, No. 26/25 Aug. 1988, p. 35, Aug. 25, 1988.

"MAN Roland Druckmaschinen AG (Pershke Price Service)", *Offsetpraxis* (66), Sep. 1988.

"Technical Progress Continues without Stop", *Druckprint* (28–29, 32), Nov. 1988.

"Bogen–Offsetmaschinen auf der IPEX 1988" (Sheet–fed Offset Presses at IPEX '88), *Offsetpraxis* 20–36 not all pages), Nov. 1988.

"Impressive Industrial Fair in Birmingham", *Ddruckprint* (52–53), Oct. 1988.

"MAN Roland Milestones for the IPEX '88: World–wide Premiere of New products and Concepts", *Der Polygraph* vol. 23–88 (2070, 2090), Dec. 1988.

Hartmut Kusch and Peter Oelfke, "Systemanbieter: der neue Vermarktungsansatz im Maschinenbau" (System Suppliers: The New Marketing Initiative in Mechanical Engineering)?.

"The IPEX 88 Was Dominated by Offset Printing—Rich Product Range for Sheet Printers", Oct. 1988.

Heidelberg Catalogue: "Data Control", After 1988.

"Neue Leitstandtechnik im Zeitungsdruck", *Deutscher Drucker* (140–157), Sep. 1987.

"Programmable Controllers for Rotary Offset Printing Machines: Power Engineering and Automation Systems for the Graphics Industry", 1986.

"CPC: Heidelberger Nachrichten 3/40", Pre '88.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–12 are cancelled.

\* \* \* \* \*